United States Patent
Heaston

(10) Patent No.: US 11,276,090 B2
(45) Date of Patent: Mar. 15, 2022

(54) VALUE MAP GENERATION AND PROCESSING

(71) Applicant: Reimagine Selling LLC, Greenwood Village, CO (US)

(72) Inventor: Richard Alan Heaston, Centennial, CO (US)

(73) Assignee: REIMAGINE SELLING LLC, Greenwood Village, CO (US)

( * ) Notice: Subject to any disclaimer, the term of this patent is extended or adjusted under 35 U.S.C. 154(b) by 348 days.

(21) Appl. No.: 16/453,793

(22) Filed: Jun. 26, 2019

(65) Prior Publication Data

US 2020/0005362 A1     Jan. 2, 2020

Related U.S. Application Data

(60) Provisional application No. 62/692,305, filed on Jun. 29, 2018.

(51) Int. Cl.
*G06Q 30/00* (2012.01)
*G06Q 30/02* (2012.01)
*G06F 16/29* (2019.01)
*G06Q 50/16* (2012.01)

(52) U.S. Cl.
CPC ......... *G06Q 30/0278* (2013.01); *G06F 16/29* (2019.01); *G06Q 50/167* (2013.01)

(58) Field of Classification Search
None
See application file for complete search history.

(56) References Cited

U.S. PATENT DOCUMENTS

| | | | |
|---|---|---|---|
| 8,010,906 B1* | 8/2011 | Sinnard | G06Q 10/06 715/771 |
| 2016/0292750 A1* | 10/2016 | Ritter | G06Q 30/0278 |
| 2017/0061507 A1* | 3/2017 | Gary, Jr | G06Q 30/0278 |
| 2017/0109413 A1* | 4/2017 | Gholami | G06Q 30/02 |

OTHER PUBLICATIONS

IP.com Search Strategy dated Aug. 3, 2021 (Year: 2021).*
STIC EIC 3600 Search Report for U.S. Appl. No. 16/453,793 dated Aug. 9, 2021 (Year: 2021).*
IP.com NPL Search Strategy dated Aug. 3, 2021 (Year: 2021).*

* cited by examiner

*Primary Examiner* — Matthew T Sittner
(74) *Attorney, Agent, or Firm* — Holland & Hart LLP

(57) ABSTRACT

A system receives value data to generate a value data object based on input received from a user. The input may include indications of priorities, descriptors, and descriptions related to known and unknown properties. The system uses the generated value data object and associated value gap score to generate property valuation prompts. The valuation prompts are utilized by the user to input evaluation data. Based on the evaluation data and the value data object, the user generates a value score for each visited property.

12 Claims, 10 Drawing Sheets

VALUE MAP GENERATION AND PROCESSING

CROSS REFERENCE TO RELATED APPLICATION

The present Application for Patent claims priority to U.S. Provisional Patent Application No. 62/692,305 by Heaston, entitled "REAL ESTATE PLANNING APPLICATION," filed Jun. 29, 2018, which is expressly incorporated by reference herein.

BACKGROUND

Some software solutions (e.g., customer relationship management (CRM)) software may focus on attracting new consumers and managing existing contacts to generate business for salespersons such as real estate agents, without focusing on the sale itself. These software solutions may account for the needs of the business or agent, but may not assist the customer in making decisions. For example, a real-estate agent and organization may utilize various systems for advertising, showing, and managing properties and potential customers. While these systems may focus on property details, the systems may not account for specific customer priorities or help the customer make decisions regarding property purchases.

DETAILED DESCRIPTION

Figure 1:
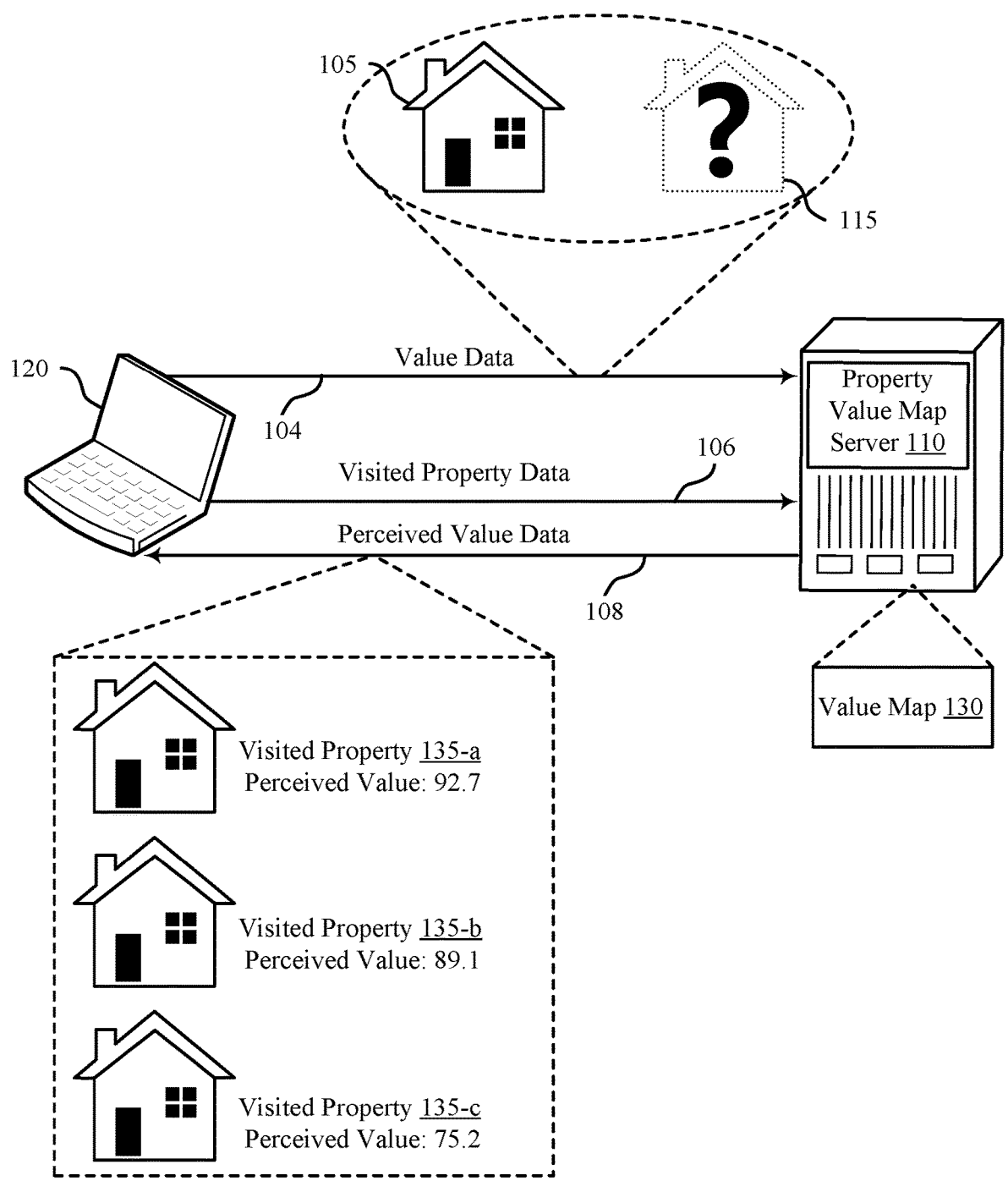
FIG. 1 illustrates a block diagram of an example system that supports property value map generation and processing in accordance with aspects of the present disclosure.

Real-estate systems may provide details about various properties for sale in a geographic region. The systems may provide details about a property, such as square footage, number of bedrooms/bathrooms, location, estimated price, pictures, etc. Users (e.g., potential customers) may utilize these systems to browse various properties. A real-estate agent may show houses to a potential customer, without having any or having very little knowledge about the desires of the customer. Further, the customer may not have considered their priorities, how their current living situation relates to or satisfies those priorities, and whether a visited property meets those priorities.

Aspects of the disclosure described herein provide a system for generating value data object based on input received from a potential customer. The value data object may represent a concise, psychographic definition of what value means to a customer in terms of the property the customer is looking to purchase. Stated differently, the value data object establishes a definition of value for a specific customer (e.g., the gold standard or "most perfect" decision for the customer). The system receives various inputs (e.g., priorities, descriptors, descriptions, and scoring metrics) via a user interface at a user device and from a potential customer to generate the value data object. To evaluate visited properties, the system generates prompts based on the value data object and receives evaluation data from the customer based on the prompts. The evaluation data represents the customer's perception of the visited property in relation to the identified priorities. The system uses the evaluation data and the value object to generate a perceived value score for the visited properties. The perceived value score represents the customer's value ascribed to the property in relation to the identified priorities. These and other aspects of the disclosure are described with respect to the figures.

As such, the inputs are used to generate the definition of value for a specific customer. In some cases, the generated value data object does not represent "factual" data, but the psychographic effects of current situations and ideal future situations, as considered by a user. These psychographic effects may be positive or negative and may be encoded in the value data object such as to assist the user in decision making and such as to be efficiently transferred between computing systems and used to determine perceived value scores using evaluation data.

It should be understood that the implementations described herein may be applicable to scenarios other than real-property. For example, a customer may enter vehicle descriptions and descriptors (both current and ideal), the system may generate a value map based on the inputs, and potential vehicles may be reviewed for evaluation data. The server may then generate a value map score and purchasing probability based on the evaluation data and the value. Other types of scenarios in which value map generation and processing may be useful may include career decisions (e.g., evaluation of current and potential jobs), relationship decisions, relocation decisions, travel decisions, vehicle decisions, education decisions, restaurant decisions, jewelry purchasing decisions, high-end clothing purchasing decisions, etc. In other words, any type of evaluation that may involve evaluation of a current situation and an ideal situation may be implemented by the systems described herein. Accordingly, a current property may correspond to a known scenario or item, and a visited property may correspond to an ideal scenario or item. Accordingly, the implementations described herein support a user in clear analysis in thinking when making impactful life decisions. Stated differently, the implementations described herein may be utilized as a decision tool, for example, when high decision risk involved.

FIG. 1 illustrates a block diagram of an example system 100 that supports property value map generation and processing in accordance with aspects of the present disclosure. The system 100 includes a user device 120 and a property value map server 110. The user device 120 may be an example of a laptop, desktop, mobile device (e.g., smart phone, tablet) or other type of mobile computing device. The property value map server 110 may be an example of an application server, content server, database server, etc. The user device 120 and the property value map server 110 may communicate via one or more communication links (e.g., via the internet, intranet, cellular network). The property value map server 110 may receive data from and transmit data to various user devices 120 for supporting value map generation and processing. In some cases, the operations performed by the property value map server 110 may be performed by (e.g., executed on) the user device 120. For example, the user device 120 may execute an application, web application, etc. that performs various operations of the property value map server 110. In some cases, the property value map server 110 exposes an endpoint (e.g., via an application programming interface (API)) for which various features of the disclosure are accessible via websites or other servers for performing the implementations as described herein. For example, a web application or application for real-estate property browsing and purchasing may access an API for the server 110. In some cases, the server 110 accesses external real-estate systems (e.g., via APIs) or using web-crawlers to retrieve property data. Thus, when a customer visits properties and inputs evaluation data, the property data is automatically populated in the system.

A user such as a real-estate agent or customer may utilize the user device 120 to input value data 104. The value data 104 may represent one or more priorities associated with a property value and may include descriptors for a current property 105 (e.g., a known property) and descriptors for unknown properties 115 corresponding to each priority. The value data 104 may further include descriptions corresponding to the descriptors and scoring metrics for each of the descriptions. For example, the known property 105 may represent the user's current property or current residence (e.g., apartment, house, condominium), and the unknown property 115 may represent an ideal property of the user or customer. The service supported by the property value map server 110 may display a prompt at the user device 120 for priorities in a property. For each selected priority, the service may prompt for descriptors of an ideal property (e.g., the unknown property 115) based on the priority. For each selected descriptor of the ideal property, the service may prompt for and receive a selection of benefit descriptions associated with the descriptor. For example, a user may select "floor plan" for a priority. Based on the selection, the service may display a prompt including a listing of descriptors of an ideal floor plan (e.g., open, light). For the descriptors of the ideal floor plan, the service displays a listing of benefit of an open or lighted floor plan (e.g., easier to entertain, easier to clean).

Further, for each priority, the service may prompt for current descriptors of the known property 105 as it relates to the priority and impact descriptions (e.g., pros and/or cons of the current property). Returning to the "floor plan" priority example, the service prompts for descriptors of the current floor plan (e.g., closed, two story). For the descriptors, the service further prompts for the impacts of the current descriptors of the floor plans on the user's life (e.g., hard to clean or hard to entertain).

For the impact descriptions for the descriptors of the known property 105, the service prompts for and receives an impact scoring metric, and for the benefit descriptions for the descriptors of the unknown property 115, the service prompts for and receives an ideal scoring metric. The scoring metrics may be selected from a range (e.g., 1 to 10).

The service generates a property value data object (e.g., value map 130) including priority data object for each priority, each descriptor, descriptions, and scoring metrics for each priority. The service calculates a value gap metric using the ideal scoring metrics and the impact scoring metric for each priority. The value gap metric represents a customer's perceived value in properties based on the selected priorities. The value gap metric may further be used to score, rank, and/or recommend visited properties 135. For example, after the user inputs the value data 104 and the value map 130 is generated, the user may visit properties and input visited property data 106 corresponding to the visited properties 135. The data may be prompted for and received based on the value map 130. Using the value map 130 and the visited property data 106, the service generates perceived values corresponding to each property. The perceived values may be returned to the device 120 as perceived value data 108 and displayed at the user device 120 for review by one or more users.

The value map data object 130 represents a psychographic definition of what value means to a customer in terms of the property the customer is looking to purchase. In other words, the value map data object 130 represents the customer's "gold standard," "most perfect" decision or definition of value when considering a property (or other values in different scenarios). Because the customer's values are represented in a data object, the data object 130 may be transmitted between various user devices, systems, etc., for utilization in property valuation. Accordingly, the customer's values may be considered on a mobile device during or closely following a property visit. The evaluation prompts may be generated based on the data object 130, such that the prompts relate to the customer's priorities. Because the value map data object 130 represents a specific customer's priorities and evaluation prompts are generated based on these priorities represented in the value map data object, computing resources (e.g., processor and memory resources) are not utilized for receiving evaluation data that may not be relevant to the specific customer. Further, because the value map data object 130 is generated based on user inputs representing a customer's perception of current situations and ideal situations, the system described herein may be easily integrated with other systems. The value map data object 130 may be a computing resource efficient (e.g., may not represent all factual data associated with a product or scenario) object for transfer and processing. Thus, rather than representing every customer's ideal factual perception (e.g., the customer wants a home with at least 4500 square feet of living space), the object represents the perceived effects of current situations and ideal situations. This allows the relatively small (e.g., in computing memory terms) to be transferred and processed, and evaluated situations/properties/items to be easily processed to compare to the value map data object 130.

Figure 2:
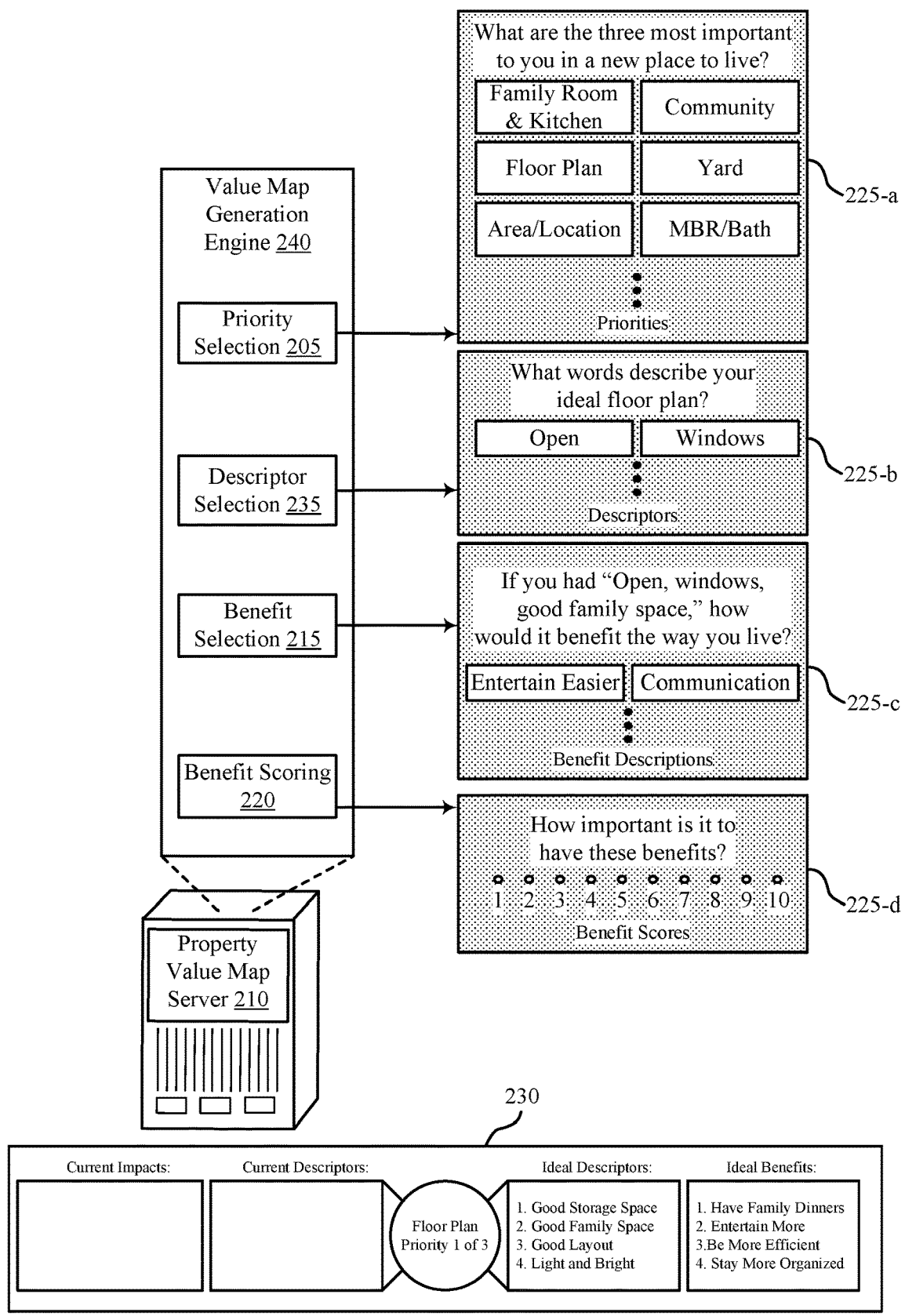
FIG. 2 illustrates a block diagram of an example system that supports property value map generation and processing in accordance with aspects of the present disclosure.

FIG. 2 illustrates a block diagram of an example system 200 that supports property value map generation and processing in accordance with aspects of the present disclosure. The system 200 includes a property value map server 210, which may be an example of the server 110 of FIG. 1. In some cases, the features described with respect to FIG. 2 may be performed (e.g., executed) by a client side application on a user device (e.g., user device 120 of FIG. 1). The property value map server 210 executes a value map generation engine 240. The value map generation engine 240 includes a priority selection component 205, a descriptor selection component 235, a benefit selection component 215, and a benefit scoring component 220. The various components support display of user interface components 225 at a user device (e.g., user device 120 of FIG. 1) for selection of various data. Thus, the components may receive the data based on selection at the user interface components 225. The user interface components 225 may partially illustrate a user interface for inputting property value data.

The priority selection component 205 receives a selection of one or more priorities from a user at user interface component 225-a. The user may select the priorities based on a personal value attributed to wants and needs in a property. The priorities may be displayed based on a list of pre-determined priorities. In some cases, the user interface component 225-a may display a field for inputting a personal or custom priority that is not pre-determined. In some cases, the user may select a limited number of priorities (e.g., three). In some cases, the user interface component 225-a may provide a control for ranking selected priorities (e.g., the user may move or drag and drop the selected priorities).

Based on the selected priorities and for each priority, the descriptor selection component 235 may cause display of a prompt at user interface component 225-b, which lists ideal descriptors for a "floor plan" priority. The descriptors may be displayed from a predetermined list of descriptors associated with the selected priorities (e.g., a floor plan priority). As such, each possible priority may have an associated list of descriptors. The ideal descriptors may be associated with a what a user may value in an ideal property (e.g., the unknown property 115 of FIG. 1). Accordingly, the descriptors may be a list of "positive" descriptors. For example, possible ideal descriptors of a floor plan priority may be "open," "lots of windows," "one story," "large living area," etc. The user may select a number of descriptors of the ideal floor plan. In some cases, the number of selections is limited (e.g., three or four selections).

Based on the selected descriptors, the benefit selection component 215 prompts the user to select how the selected ideal descriptors would benefit the user, and the selections are referred to herein as "benefit descriptions." As illustrated, the user selects "open," "windows," and "good family space" as ideal descriptors of the floor plan priority. Accordingly, the user interface component 225-c prompts: "If you had 'open, windows, and good family space,' how would it benefit the way you live?". The user may select a number of benefit descriptions from the displayed list. In some cases, the list is selected from a predetermined list. Accordingly, each selected priority type may have an associated list of benefit descriptions. In some cases, the number of selections is limited (e.g., three or four).

The benefit scoring component 220 receives a selection of a scoring metric for the benefits from user interface component 225-d. The user interface component 225-d prompts for a level of importance applicable to the selected benefit descriptions. In some cases, a range of scores (e.g., one to ten) is presented for selection by the user. Responsive to the selection at user interface components 225 of data corresponding to an unknown property (or ideal data), the property value map server 210 generates a property value data object 230. In FIG. 2, the property value data object 230 is a visual representation of the data object, which may be displayed at a user interface of a user device.

Figure 3:
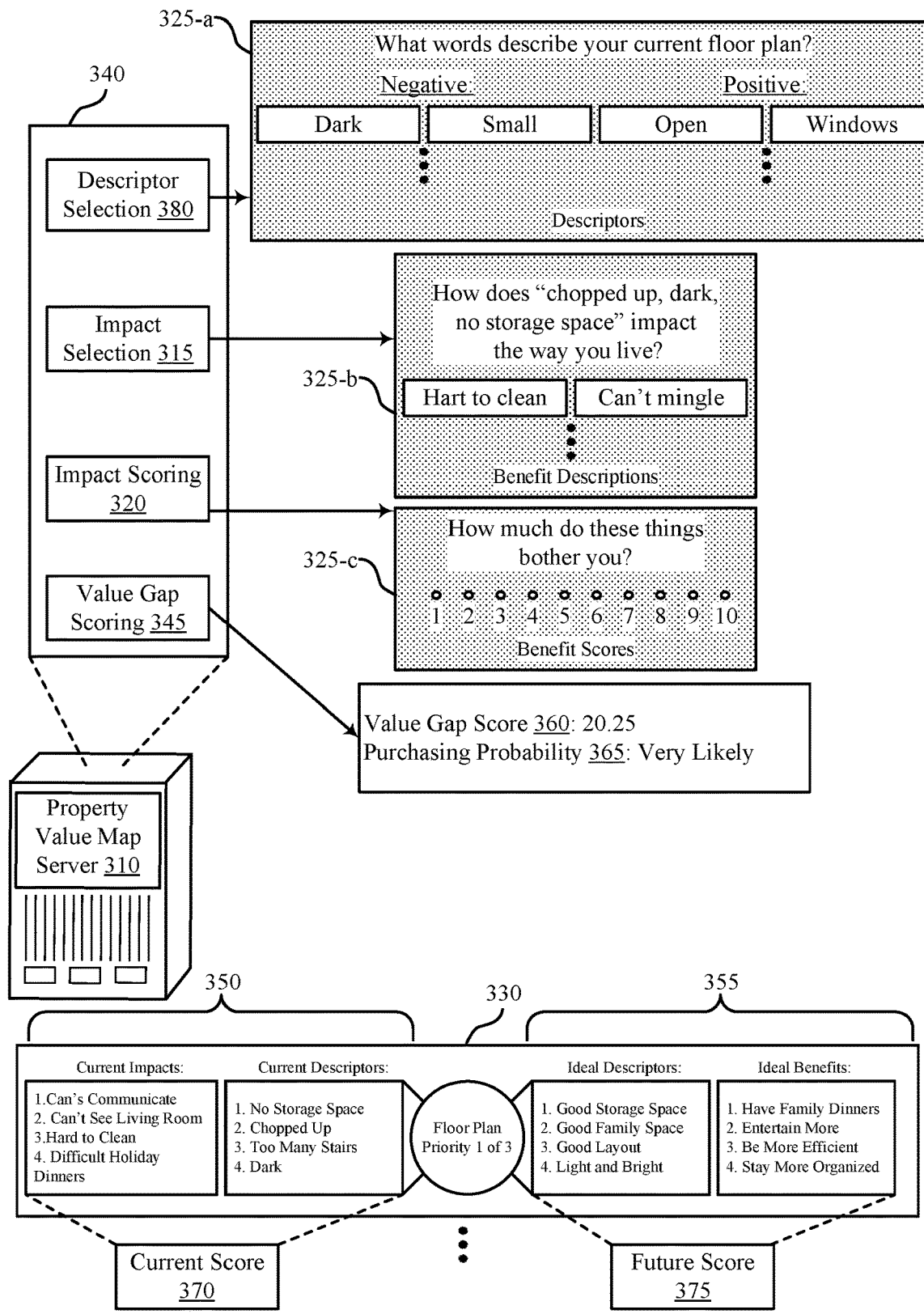
FIG. 3 illustrates a block diagram of an example system that supports property value map generation and processing in accordance with aspects of the present disclosure.

FIG. 3 illustrates a block diagram of an example system 300 that supports property value map generation and processing in accordance with aspects of the present disclosure. The system 300 includes a property value map server 310, which may be an example of the server 110 of FIG. 1 or 210 of FIG. 2. In some cases, the features described with respect to FIG. 3 may be performed (e.g., executed) by a client side application on a user device (e.g., user device 120 of FIG. 1). The property value map server 310 executes a value map generation engine 340. The value map generation engine 340 may be an example of the value map generation engine 240 of FIG. 2, and includes a descriptor selection component 380, an impact selection component 315, an impact scoring component 320, and a value gap scoring component 345. The various components support display of user interface components 325 at a user device (e.g., user device 120 of FIG. 1) for selection of various data. Thus, the components may receive the data based on selection at the user interface components 325. The user interface components 325 may partially illustrate a user interface for inputting property value data.

The descriptor selection component 380 receives a selection of one or more current descriptors corresponding to a known property (e.g., the known property 105 of FIG. 1). The descriptors may be selected from a list selected based on the associated priority. Further, for the known property, the user interface component 325-a may display a listing of positive descriptors and a listing of negative descriptors associated with the property. Accordingly, the user may select descriptors based on whether the user is satisfied or unsatisfied with their current property as it relates to the priority. In some cases, the user is limited to a number of descriptors, and in some cases, the user may select only positive descriptors or only negative descriptors. Accordingly, one of the descriptors is selected, then the descriptors from the other descriptor type (e.g., positive or negative) may be removed or rendered not selectable.

The impact selection component 315 causes to display (e.g., at user interface component 325-b) a listing of impact descriptions corresponding to the descriptors selected for the priority. In some cases, the displayed listing of impact descriptions are conditional on whether the user selects positive or negative descriptors at user interface component 325-a. Thus, if the user selects positive descriptors for the current living situation (e.g., known property) and corresponding to the priority, then the impact selection component 315 causes to display positive impacts or the priority. In contrast, if the user selects negative descriptors for the known property, then the impact selection component 315 may cause to display negative impacts. Accordingly, the server 310 may store a listing of descriptors for each priority, and the listing of descriptors includes a subset of negative descriptors and a subset of positive descriptors. Further, the server may store a listing of negative impact descriptions and positive impact descriptions for each priority.

The impact scoring component 320 receives a selection of a scoring metric for the benefits from user interface component 325-c. The user interface component 325-c prompts for a level of importance applicable to the selected benefit descriptions. In some cases, a range of scores (e.g., one to ten) is presented for selection by the user. Responsive to the selection at user interface components 325 of data corresponding to the known property, the property value map server 310 may augment a property value data object 330 with the data corresponding to the known property. In FIG. 3, the property value data object 330 is a visual representation of the data object, which may be displayed at a user interface of a user device. The value data object 330 may include a priority data object for each priority selected (e.g., at the priority selection component 205 of FIG. 2). the value data object 330 illustrated in FIG. 3 shows only one priority, but it should be understood that the object 330 may include multiple (e.g., three) priorities and associated data. Accordingly, the implementations described with respect to FIGS. 2 and 3 may be repeated (e.g., iterated) for each priority. The repeated operations for each priority may include receiving priority descriptors (both current descriptors and ideal descriptors), receiving impact descriptions for the current descriptors, benefit descriptions for the ideal descriptors, impact scoring metrics, and benefit scoring metrics. The data corresponding to the known property may be referred to as current data 350, while the data corresponding to the unknown property (e.g., ideal property) may be referred to as future data 355

Based on the data for each priority in the value data object 330, the value gap scoring component 345 generates a value gap score 360. The value map score may be calculated using the impact scoring metrics, benefit scoring metrics, and the selections of descriptors and descriptions. For example, the current data 350 corresponding to the known property may be initialized with a current score 370 (e.g., −5.0), and the future data 355 corresponding to the unknown property (e.g., future property or ideal property) may be initialized with a future score 375 (e.g., 5.0). In some cases, a user is presented with a one or more "why change" questions prior to entering the current and future data. For each "why change" question answered, the initialized scores are increased or decreased. For example, for each why change question answered, the current score 370 for the current data 350 is decreased to −5.5, and the future score 375 for the future data 355 is increased to 5.5.

For each current impact, the current score 370 may be decreased by value (e.g., 0.25). Thus, if a maximum allowed selection of impacts (e.g., impact descriptions) is 4, then the current score 370 may be decreased by a total of 1 per priority. If there are three priorities selected, then 3.0 is the maximum decrease for current affects. For each current descriptor selected, the current score 370 may be decreased by 0.125. Thus, if a maximum allowed selection of impacts (e.g., impact descriptions) is 4, then the current score 370 may be decreased by a total of 0.5 per priority. If there are three priorities selected, then 1.5 is the maximum decrease for current affects. The future score 375 may be increased in the same manner. For example, the future score 375 is increased 0.25 per benefit description and 0.125 per ideal descriptor (e.g., future descriptor) per priority. Further, impact scoring metric and the ideal scoring metric may be used to weight the scoring for each priority. As such, the current score for each priority may be calculated as:

$$\text{Priority1} = (\text{Num}_{CurrentImpact}*0.25 + \text{NUM}_{CurrentDescriptors}*0.125 + \text{NUM}_{whyChangeAns}*0.05)*W_{c1}$$

$$\text{Priority2} = (\text{Num}_{CurrentImpact}*0.25 + \text{NUM}_{CurrentDescriptors}*0.125 + \text{NUM}_{whyChangeAns}*0.05)*W_{c2}$$

$$\text{Priority3} = (\text{Num}_{CurrentImpact}*0.25 + \text{NUM}_{CurrentDescriptors}*0.125 + \text{Num}_{whyChangeAns}*0.05)*W_{c3}$$

Total Current Score 370=Initialized score−priority1−priority2−priority3

The future score 375 may be calculated as:

$$\text{Priority1} = (\text{Num}_{FutureImpact}*0.25 + \text{NuM}_{FutureDescriptors}*0.125 + \text{NUM}_{whyChangeAns}*0.05)*W_{f1}$$

$$\text{Priority2} = (\text{Num}_{FutureImpact}*0.25 + \text{NuM}_{FutureDescriptors}*0.125 + \text{NUM}_{whyChangeAns}*0.05)*W_{f2}$$

$$\text{Priority3} = (\text{NUM}_{FutureImpact}*0.25 + \text{NuM}_{FutureDescriptors}*0.125 + \text{NuM}_{whyChangeAns}*0.05)*W_{f3}$$

$W_c$ corresponds to the current weight based on the received impact scoring metric for the corresponding priority, and $W_f$ corresponds to the future weight based on the received ideal scoring metric for the corresponding priority. The weights may be a multiplier which is increased with the increased score. For example, a score of 1 is a 0.25 multiplier, while a score of 10 is a 1.0 multiplier. In some cases, the weights may be determined based on the following:

If the impact scoring metric or ideal scoring metric is 9 or 10, then the corresponding weight is 1.0.
If the impact scoring metric or ideal scoring metric is 8, then the corresponding weight multiplier is 0.8.
If the impact scoring metric or ideal scoring metric is 7, then the corresponding weight multiplier is 0.5.
If the impact scoring metric or ideal scoring metric is 5 or below, then the corresponding weight multiplier is 0.25.

The value gap score 360 may be determined based on a difference between the future score 375 and the current score 370. Based on the value gap score 360, the server 310 may indicate a purchasing probability 365 for the user. For example, a value gap score above 16 may correspond to a high probability, while a value gap score below 12 may correspond to a low probability.

In some cases, the lists of affects, impacts, benefits, etc. may be customizable or conditional based on target segments of users. For example, a first set of descriptor/descriptions may correspond to a first segment of potential customers (e.g., males under forty) while a second set of descriptor/descriptions may correspond to a second of potential customers (e.g., males over sixty). Accordingly, a user may generate different priorities and priority descriptors and impacts for different segments. In some cases, the system may utilize machine learning to organize inputs from various users into groupings based on data associated with the customers (e.g., age, income, gender, etc.). The listing position may further be based on metrics such as likelihood of selection, customer segmentation, etc. For example, a more likely selection may be listed towards the top of the prompt, while a less likely selection may be listed towards the bottom. In some cases, the listings are customizable for a particular user. For example, if a user is real-estate listing company, the user may configure their own lists of descriptors/descriptions. The value map data object 330 represents a psychographic definition of what value means to a customer in terms of the property the customer is looking to purchase. The value map 330 represents both a qualitative and quantitative customer definition of what value means to them.

Figure 4:
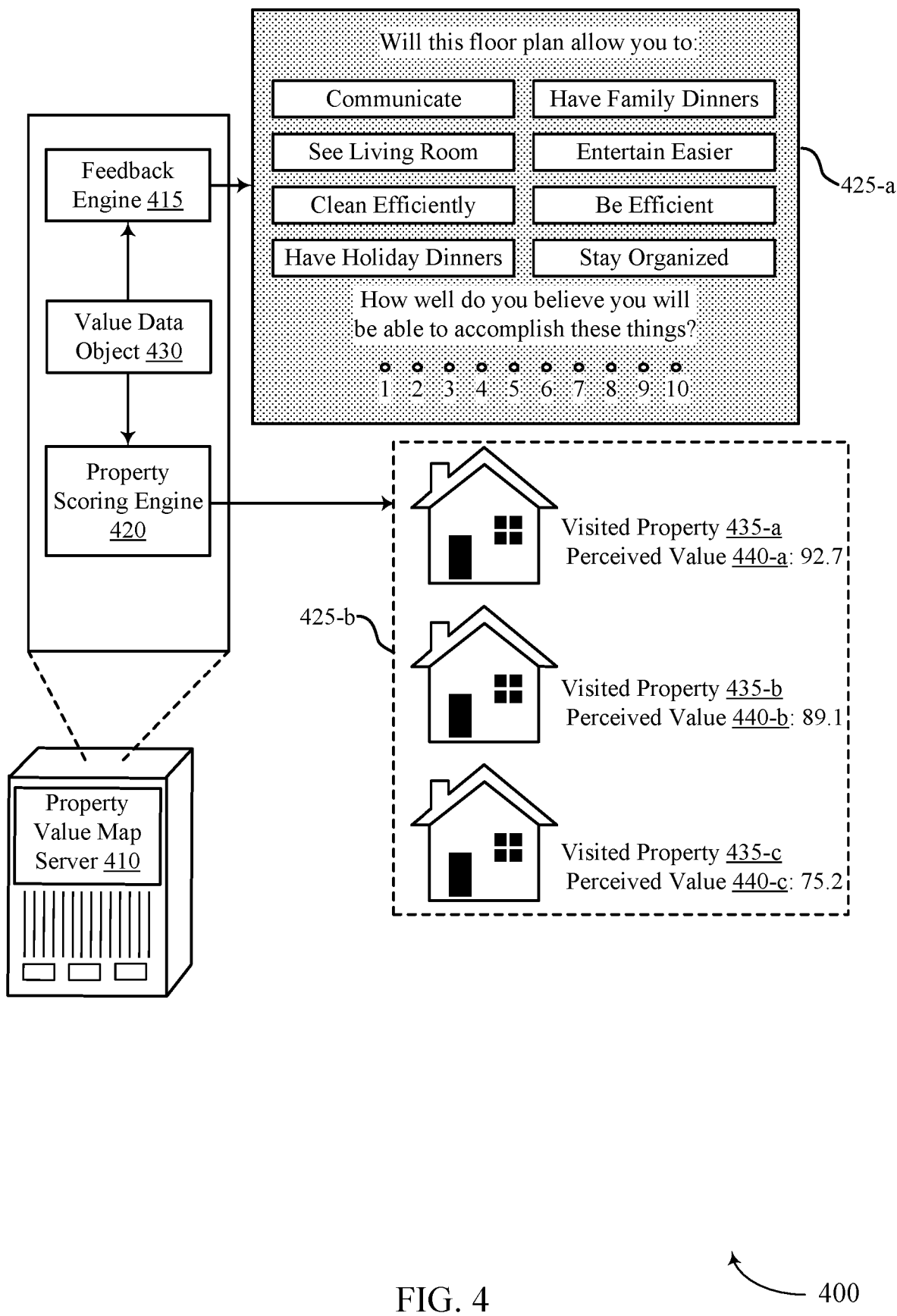
FIG. 4 illustrates a block diagram of an example system that supports property value map generation and processing in accordance with aspects of the present disclosure.

FIG. 4 illustrates a block diagram of an example system 400 that supports property value map generation and processing in accordance with aspects of the present disclosure. The system 400 includes a property value map server 410, which may be an example of the server 110 of FIG. 1, 210 of FIG. 2, or 310 of FIG. 3. In some cases, the features described with respect to FIG. 4 may be performed (e.g., executed) by a client side application on a user device (e.g., user device 120 of FIG. 1). The property value map server 410 executes a feedback engine 415 and a property scoring engine 420. The various components support display of user interface components 425 at a user device (e.g., user device 120 of FIG. 1) for selection of various data. Thus, the components may receive the data based on selection at the user interface components 425. The user interface components 425 may partially illustrate a user interface for inputting property value data.

In FIG. 4, a user may have entered known and unknown property data as described with respect to FIGS. 2 and 3, and the server 410 generates the value data object 430 based on the received data. The value data object 430 includes priorities, data associated with the priorities, and a value gap score. The user may visit properties and enter data corresponding to visited properties 435.

The feedback engine 415 causes one or more prompts to be displayed at a user interface component 425-*a*. The prompts are based on the data from value data object 430. As illustrated in FIG. 4, the prompt is generated based on a user selecting "floor plan" as a priority. The displayed answers are selected based on the current and ideal descriptions input by the user for the floor plan priority. For example, when describing the current floor plan, the user may select "hard to find things." When the prompt is being displayed for evaluating a property, the server generates "easily and quickly find things" as a prompt. Accordingly, the server 410 turns "negative" answers into "positive" prompts for property evaluation. The user enters a selection of how well the priority (e.g., floor plan) will allow the user to do the listed descriptions. The selection may be a range (e.g., 1 to 10). A prompt for each priority may be generated by the feedback engine 415. Thus, the user may input scores for each priority for each visited property 435. The feedback engine may store a listing of negative descriptors/descriptions with corresponding positive descriptors descriptions. For example, a negative current descriptor may be "poor streetscape" and a corresponding positive descriptor may be "nice streetscape." Thus, when the negative current descriptor of "poor streetscape" is selected, then a corresponding prompt for property evaluation might say "does this property have a nice streetscape?".

Because the user interface component 425-*a* may be displayed at a user device, the user may enter the visited property data for each property during visiting a property or within a short time of visiting the property. In other words, the data may be input on a mobile device during or after visiting the property, such as to provide an accurate representation of the user's feelings about a property.

The property scoring engine 420 receives evaluation data based on input at the feedback engine 415. The evaluation data may include a matching score for each priority for each property. For example, the value that the user selects between 1 and 10 may be the matching score for that priority of the corresponding property. Using the value data object 430 (e.g., the value gap score), the property scoring engine 420 generates perceived values 440 for each of the properties. To generate the perceived values, the property value map server 410 identifies a weight multiplier based on the value gap score (e.g., generated as discussed with respect to FIG. 3). In some cases, if the value gap score is above 16, then the weight multiplier may be set to 2.0, and if the value gap score is below 16, then the weight multiplier may be set to 1.75. Other multiplier values may be generated according to various implementations.

Using the priority matching scores, the value gap score, and the weight value generated based on the value gap score, the property scoring engine 420 generates the perceived values 440. In some cases, the perceived values are calculated as:

Perceived value 440=(Value Gap Score+Priority 1 Matching Score+Priority 2 Matching Score+ Priority 3 Matching Score)*Weight Multiplier.

For example, if the value gap score is 18, the priority 1 matching score is 8, the priority 2 matching score is 9, and the priority 3 matching score is 8, then (18+8+8+9)*2.0=88, which may be represented as 88%. The process may be repeated for multiple visited properties 435 to identify corresponding perceived values 440. Accordingly, a user may use their identified priorities, descriptions, etc. and the property evaluation data to identify property that may be considered satisfactory based on their values.

Accordingly, the implementations described herein may support prevention of customer confusion when making a impactful (e.g., expensive) life decisions such as purchasing a home. Confusion may be a customer's worst enemy. If a customer is overwhelmed or confused, the customer may back away from or delay a decision. The implementations described provide a path for clear thinking. Further, the effectively removes price from the evaluation process when determining a real perceived value for the customer.

Figure 5:
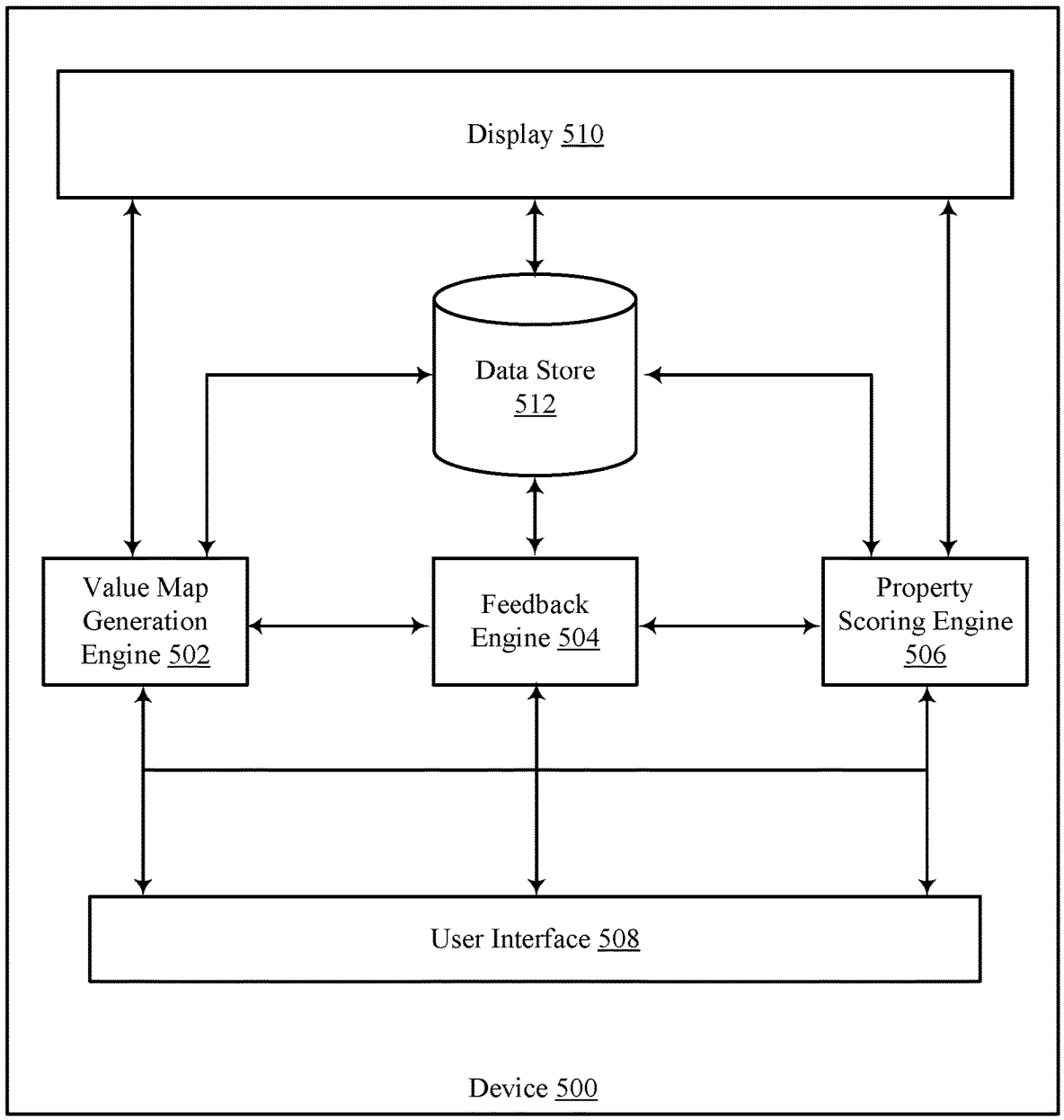
FIG. 5 illustrates an example device supporting property value map generation and processing in accordance with aspects of the present disclosure.

FIG. 5 illustrates a block diagram of an example device 500 executing a real estate planning application. The device 500 may be an example of the server 110, 210, 310, 410 or the user device 120 of FIGS. 1 to 4. The device 500 includes a value map generation engine 502, a customer feedback engine 504, and a property ranking engine 506, which may be examples of the corresponding components of FIGS. 1 to 4. The value map generation engine 502 executes on one or more processors of the device 500 (not shown) to generate a value map (e.g., value data object) for a customer. A value map is a concise, psychographic definition of what value means to the customer based on input that the value map generation engine 502 receives from the customer through a user interface 508. The value map generation engine 502 receives input from the user interface 508 and may display output information on a display 510 of the device 500. The value map generation engine 502 may also use data from a datastore 512 on the device 500. The value map generation engine 502 may also communicate with the customer feedback engine 504 and the property ranking engine 506. The datastore 512 may store various potential priorities, descriptors (e.g., ideal and current), descriptions (e.g., impact and benefit), positive and negative descriptions, etc.

Further, the various components may update the data based on input from a user. For example, a user may enter a custom priority, custom descriptors, and/or custom descriptions. Thus, the datastore 512 may be updated based on the custom inputs, which may be used for subsequent value map object generation and processing. In some cases, the device 500 may include a machine learning component for processing custom data. For example, the device 500 may include a machine learning component that analyzes custom inputs to determine semantics (e.g., whether an input is positive or negative), determine whether the custom inputs are related to an existing descriptor (e.g., using natural language processing or matching techniques), etc. Accordingly, the machine learning component can reduce redundant descriptors based on inputs by a user. In some cases, the component may introduce variations of descriptors that are prompted to users and adjust the descriptor prompts based on user selections. Thus, the device may present more accurate descriptors that are more likely to be selected by a user.

The customer feedback engine 504 executes on one or more processors of the device 500 and is configured to receive customer feedback (e.g., evaluation data) regarding visited properties. The customer input may be received through the user interface 508. Prompts to the customer to enter information may be displayed on the display 510 of the device 500. The customer feedback engine 504 may communicate with the property ranking engine 506. The property ranking engine 506 is executed on one or more processors of the device 500 and is configured to generate a comparison score (e.g., perceived value) for each of the one or more visited properties based on the customer value map and the received customer evaluation data of each of the one or more visited properties. The comparison score may be displayed through the display 510 of the device 500.

Figure 6:
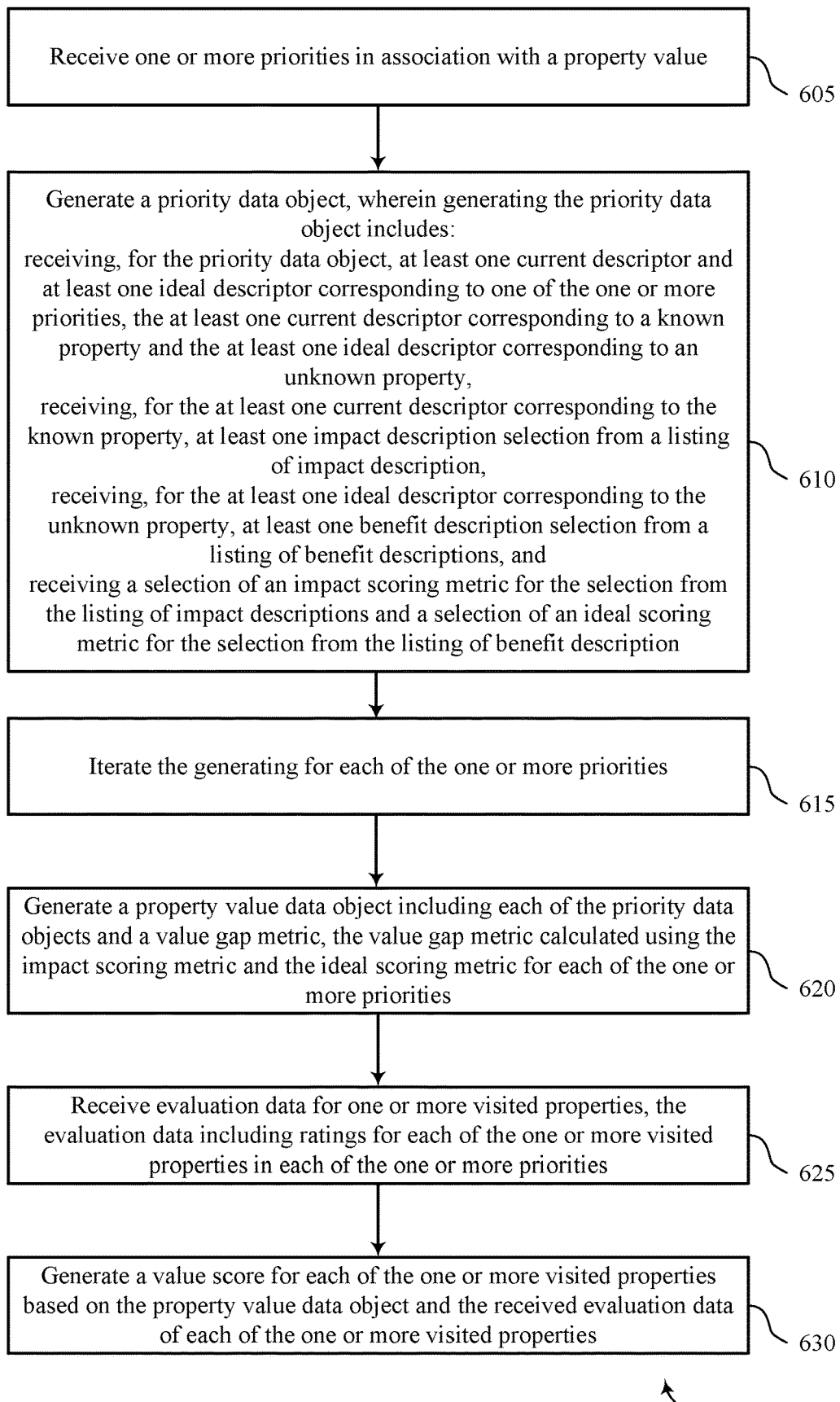
FIGS. 6 through 9 show flowcharts illustrating methods that support property value map generation and processing in accordance with aspects of the present disclosure.

FIG. 6 shows a flowchart illustrating a method 600 that supports property value map generation and processing in accordance with aspects of the present disclosure. The operations of method 600 may be implemented by a server or user device or their components as described herein. In some examples, a server or user device may execute a set of instructions to control the functional elements of the server or user device to perform the functions described herein. Additionally or alternatively, a server or user device may perform aspects of the functions described herein using special-purpose hardware.

At 605, the server or user device may receive one or more priorities in association with a property value. In some cases, the priorities may be referred to as customer priorities. A customer priority may be any priority that a customer values in a property. Customer priorities may be related to physical characteristics of the property or to the lifestyle that the customer hopes to achieve by purchasing the property. For example, without limitation, customer priorities may include location of a Community, Master Bedroom/Bath, Kitchen/ Family Room, Home Site, Floor Plan, Activity Schedule, Social Lifestyle, Area/Location, etc. The operations of 605 may be performed according to the methods described herein. In some examples, aspects of the operations of 605 may be performed by a value map generation engine as described with reference to FIGS. 2 through 5.

At 610, the server or user device may generate a priority data object, where generating the priority data object includes, receiving, for the priority data object, at least one current descriptor and at least one ideal descriptor corresponding to one of the one or more priorities, the at least one current descriptor corresponding to a known property and the at least one ideal descriptor corresponding to an unknown property, receiving, for the at least one current descriptor corresponding to the known property, at least one impact description selection from a listing of impact descriptions, receiving, for the at least one ideal descriptor corresponding to the unknown property, at least one benefit description selection from a listing of benefit descriptions, and receiving a selection of an impact scoring metric for the selection from the listing of impact descriptions and a selection of an ideal scoring metric for the selection from the listing of benefit descriptions. In some cases, the descriptors may be referred to as "Words that describe." The one or more customer Words That Describe are each selected from a generated list of researched potential customer values corresponding to one of the customer priorities. For example, a customer may have selected "floor plan" as a priority. First, a list of potential customer Words That Describe is generated based on the priority. For example, the customer may be presented with a list including "open floor plan," "one level floor plan," "main level master bedroom, lots of windows, high ceilings" etc. The customer may choose "open floor plan" and "one level floor plan" as the customer Words That Describe corresponding to the "floor plan" customer priority as ideal descriptors. The operations of 610 may be performed according to the methods described herein. In some examples, aspects of the operations of 610 may be performed by a value map generation engine as described with reference to FIG. 2 through 5.

The benefit descriptions may be referred to as "customer benefits." The customer benefits (e.g., benefit(s), gain(s), do for you, achieve, etc.) correspond to the customer Words That Describe (e.g., ideal descriptors). In this example, the customer has chosen "open floor plan" and "one level floor plan" as the descriptors. The customer may then input customer benefits corresponding to both "open floor plan" and "one level floor plan." The customer may input customer benefits in several ways. In one implementation, the customer may select customer benefits from a list of potential customer benefits, similar to the selection of the customer priorities. In other implementations, the customer may provide the customer benefits using a user input device, such as, for example, a keyboard or touch screen. A customer benefit (e.g., benefit description) may be any benefit the customer expects to get or gain from the corresponding customer value. For example, for the customer value of "open floor plan," the customer may choose "entertain more," "watching tv while cooking," or "space for holiday dinners" as customer benefits. In some implementations, the customer may select multiple customer benefits for each priority. In other implementations, the customer may be asked to select the most important or relevant customer benefit for each customer priority.

The received current descriptors, which may be referred to as "customer situation descriptors," may be selected from a list. For example, when the relevant customer priority is "floor plan," a list of potential current customer situation descriptors may be generated, including, for example, "closed off;" "too many stairs," and "no storage space" as current customer situation descriptors (e.g., current descriptors). In some implementations, such as in the above example, the current customer situation descriptors may reflect aspects of the customer's current situation that the customer wants to fix (e.g., corresponding to a known property). In other implementations, a second list of potential current customer situation descriptors may be generated, reflecting aspects of the customer's current situation that the customer wants to duplicate in a new property. The customer may choose current customer situation descriptors from the generated lists.

The impact descriptions may be referred to as "customer affects." The customer affects correspond to the chosen current customer situation descriptors. For example, a customer may have chosen "closed off" and "too many stairs" as the current customer situation descriptors. The customer may then input customer affects (e.g., impact descriptions) corresponding to both "closed off" and "too many stairs." The customer may input customer affects in several ways. In one implementation, the customer may select customer affects from a list of potential customer affects, similar to the selection of the customer priorities. In other implementations, the customer may provide the customer affects using a user input device, such as, for example, a keyboard or touch screen. Customer affects may be any affect that the corresponding current customer situation has on the customer's lifestyle or living or everyday life. For example, if the current customer situation descriptor is "closed off," the corresponding customer affects may be, for example, "difficult to entertain" and "can't talk back and forth."

The impact scoring metric (e.g., an affect score) and the ideal scoring metric (e.g., a benefit score) may be determined based on input by a user. For example, the customer may be asked to rank "How Important is it to Have", on a scale of 1 to 10, how important a particular customer benefit is to the customer in making the most perfect decision (whether selling or listing) they can make in finding a new home or other real estate property. As another example for impact scoring metric, the customer may be asked to rank "How Much Does The Affect You" or "How Big Are The Consequences" or What's The Impact," on a scale of 1 to 10, how a particular customer affect is to the customer. In other implementations, different scales or methods may be used. For example, the customer may be presented with a slider interface ranging from "not important" to "very important." The score may then be generated based on where the customer adjusts the slider. A customer affect may be important to a customer to avoid in a new property or to duplicate in a new property.

At 615, the server or user device may iterate the generating for each of the one or more priorities. The operations of 615 may be performed according to the methods described herein. In some examples, aspects of the operations of 615 may be performed by a value map generation engine as described with reference to FIGS. 2 through 5.

At 620, the server or user device may generate a property value data object including each of the priority data objects and a value gap metric, the value gap metric calculated using the impact scoring metric and the ideal scoring metric for each of the one or more priorities. A value map data object represents a concise, psychographic definition of what value means to a customer in terms of the property the customer is looking to purchase. The value gap metric may be calculated using several formulas. For example, the value gap metric may be equal to the number of answers added to customer benefit score added to the current customer affect score and multiplied by a weighted adjustment. The operations of 620 may be performed according to the methods described herein. In some examples, aspects of the operations of 620 may be performed by a value map generation engine 502 as described with reference to FIGS. 2 through 5.

At 625, the server or user device may receive evaluation data for one or more visited properties, the evaluation data including ratings for each of the one or more visited properties in each of the one or more priorities. The customer may be asked to rate the property on "How Well They are Able To Achieve These Things" on a scale of 1 to 10 or on another scale for each selected customer benefit. The operations of 625 may be performed according to the methods described herein. In some examples, aspects of the operations of 625 may be performed by a feedback engine 504 as described with reference to FIGS. 2 through 5.

At 630, the server or user device may generate a value score for each of the one or more visited properties based on the property value data object and the received evaluation data of each of the one or more visited properties. The value score (e.g., a comparison score) for each of the visited properties may be generated based on the customer value map and the received customer evaluation data. This score may be generated based on a calculation of a Customer Perceived Value Score by adding the Value Gap calculation to the Priority 1 customer score added to the Priority 2 customer score added to the Priority 3 customer score and multiplied by a weighted adjustment. The operations of 630 may be performed according to the methods described herein. In some examples, aspects of the operations of 630 may be performed by a property scoring engine 506 as described with reference to FIGS. 4 through 5.

Figure 7:
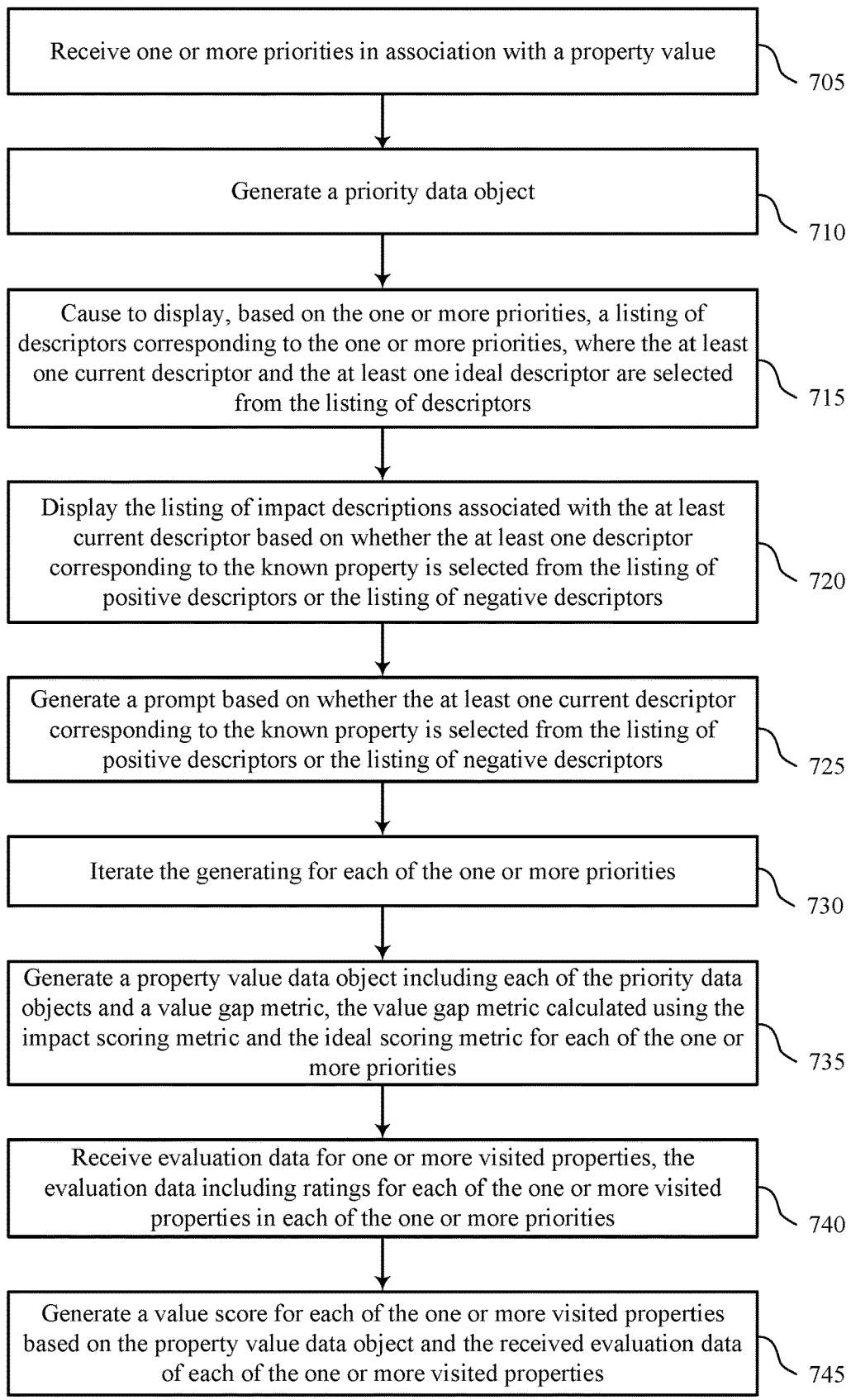

FIG. 7 shows a flowchart illustrating a method 700 that supports property value map generation and processing in accordance with aspects of the present disclosure. The operations of method 700 may be implemented by a server or user device or its components as described herein. In some examples, a server or user device may execute a set of instructions to control the functional elements of the server or user device to perform the functions described herein. Additionally or alternatively, a server or user device may perform aspects of the functions described herein using special-purpose hardware.

At 705, the server or user device may receive one or more priorities in association with a property value. The operations of 705 may be performed according to the methods described herein. In some examples, aspects of the operations of 705 may be performed by a value map generation engine as described with reference to FIGS. 2 through 5.

At 710, the server or user device may generate a priority data object. Generation of the priority data object may include the operation 610 as described in FIG. 6. The operations of 710 may be performed according to the methods described herein. In some examples, aspects of the operations of 710 may be performed by a value map generation engine as described with reference to FIGS. 2 through 5.

At 715, the server or user device may cause to display, based on the one or more priorities, a listing of descriptors corresponding to the one or more priorities, where the at least one current descriptor and the at least one ideal descriptor are selected from the listing of descriptors. The operations of 715 may be performed according to the methods described herein. In some examples, aspects of the operations of 715 may be performed by a value map generation engine as described with reference to FIGS. 2 through 5.

At 720, the server or user device may display the listing of impact descriptions associated with the at least one current descriptor based on whether the at least one descriptor corresponding to the known property is selected from the listing of positive descriptors or the listing of negative descriptors. The operations of 720 may be performed according to the methods described herein. In some examples, aspects of the operations of 720 may be performed by a value map generation engine as described with reference to FIGS. 2 through 5.

At 725, the server or user device may generate a prompt based on whether the at least one current descriptor corresponding to the known property is selected from the listing of positive descriptors or the listing of negative descriptors. The operations of 725 may be performed according to the methods described herein. In some examples, aspects of the operations of 725 may be performed by a value map generation engine as described with reference to FIGS. 2 through 5.

At 730, the server or user device may iterate the generating for each of the one or more priorities. The operations of 730 may be performed according to the methods described herein. In some examples, aspects of the operations of 730 may be performed by a value map generation engine as described with reference to FIGS. 2 through 5.

At 735, the server or user device may generate a property value data object including each of the priority data objects and a value gap metric, the value gap metric calculated using the impact scoring metric and the ideal scoring metric for each of the one or more priorities. The operations of 735 may be performed according to the methods described herein. In some examples, aspects of the operations of 735 may be performed by a value map generation engine as described with reference to FIGS. 2 through 5.

At 740, the server or user device may receive evaluation data for one or more visited properties, the evaluation data including ratings for each of the one or more visited properties in each of the one or more priorities. The operations of 740 may be performed according to the methods described herein. In some examples, aspects of the operations of 740 may be performed by a feedback engine as described with reference to FIGS. 4 through 5.

At 745, the server or user device may generate a value score for each of the one or more visited properties based on the property value data object and the received evaluation data of each of the one or more visited properties. The operations of 745 may be performed according to the methods described herein. In some examples, aspects of the operations of 745 may be performed by a property scoring engine as described with reference to FIGS. 4 through 5.

Figure 8:
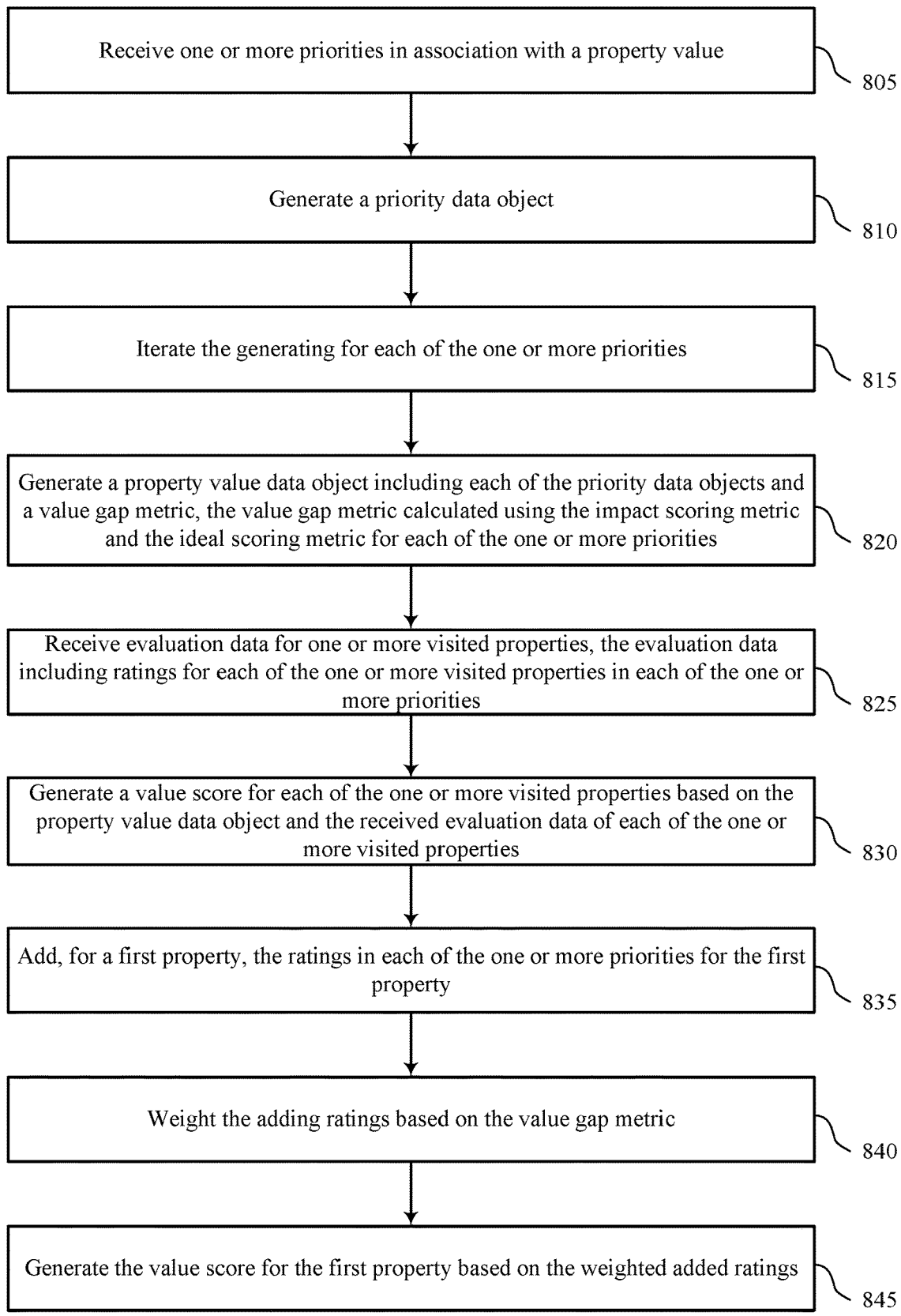

FIG. 8 shows a flowchart illustrating a method 800 that supports property value map generation and processing in accordance with aspects of the present disclosure. The operations of method 800 may be implemented by a server or user device or their components as described herein. In some examples, a database server may execute a set of instructions to control the functional elements of the database server to perform the functions described herein. Additionally or alternatively, a server or user device may perform aspects of the functions described herein using special-purpose hardware.

At 805, the server or user device may receive one or more priorities in association with a property value. The operations of 805 may be performed according to the methods described herein. In some examples, aspects of the operations of 805 may be performed by a value map generation engine as described with reference to FIGS. 2 through 5.

At 810, the server or user device may generate a priority data object. Generation of the priority data object may include the operation 610 as described in FIG. 6. The operations of 810 may be performed according to the methods described herein. In some examples, aspects of the operations of 810 may be performed by a value map generation engine as described with reference to FIGS. 2 through 5.

At 815, the server or user device may iterate the generating for each of the one or more priorities. The operations of 815 may be performed according to the methods described herein. In some examples, aspects of the operations of 815 may be performed by a value map generation engine as described with reference to FIGS. 2 through 5.

At 820, the server or user device may generate a property value data object including each of the priority data objects and a value gap metric, the value gap metric calculated using the impact scoring metric and the ideal scoring metric for each of the one or more priorities. The operations of 820 may be performed according to the methods described herein. In some examples, aspects of the operations of 820 may be performed by a value map generation engine as described with reference to FIGS. 2 through 5.

At 825, the server or user device may receive evaluation data for one or more visited properties, the evaluation data including ratings for each of the one or more visited properties in each of the one or more priorities. The operations of 825 may be performed according to the methods described herein. In some examples, aspects of the operations of 825 may be performed by a feedback engine as described with reference to FIGS. 2 through 5.

At 830, the server or user device may generate a value score for each of the one or more visited properties based on the property value data object and the received evaluation data of each of the one or more visited properties. The operations of 830 may be performed according to the methods described herein. In some examples, aspects of the operations of 830 may be performed by a property scoring engine as described with reference to FIGS. 2 through 5.

At 835, the server or user device may add, for a first property, the ratings in each of the one or more priorities for the first property. The operations of 835 may be performed according to the methods described herein. In some examples, aspects of the operations of 835 may be performed by a value map generation engine as described with reference to FIGS. 2 through 5.

At 840, the server or user device may weigh the added ratings based on the value gap metric. The operations of 840 may be performed according to the methods described herein. In some examples, aspects of the operations of 840 may be performed by a value map generation engine as described with reference to FIGS. 2 through 5.

At 845, the server or user device may generate the value score for the first property based on the weighted added ratings. The operations of 845 may be performed according to the methods described herein. In some examples, aspects of the operations of 845 may be performed by a value map generation engine as described with reference to FIGS. 2 through 5.

Figure 9:
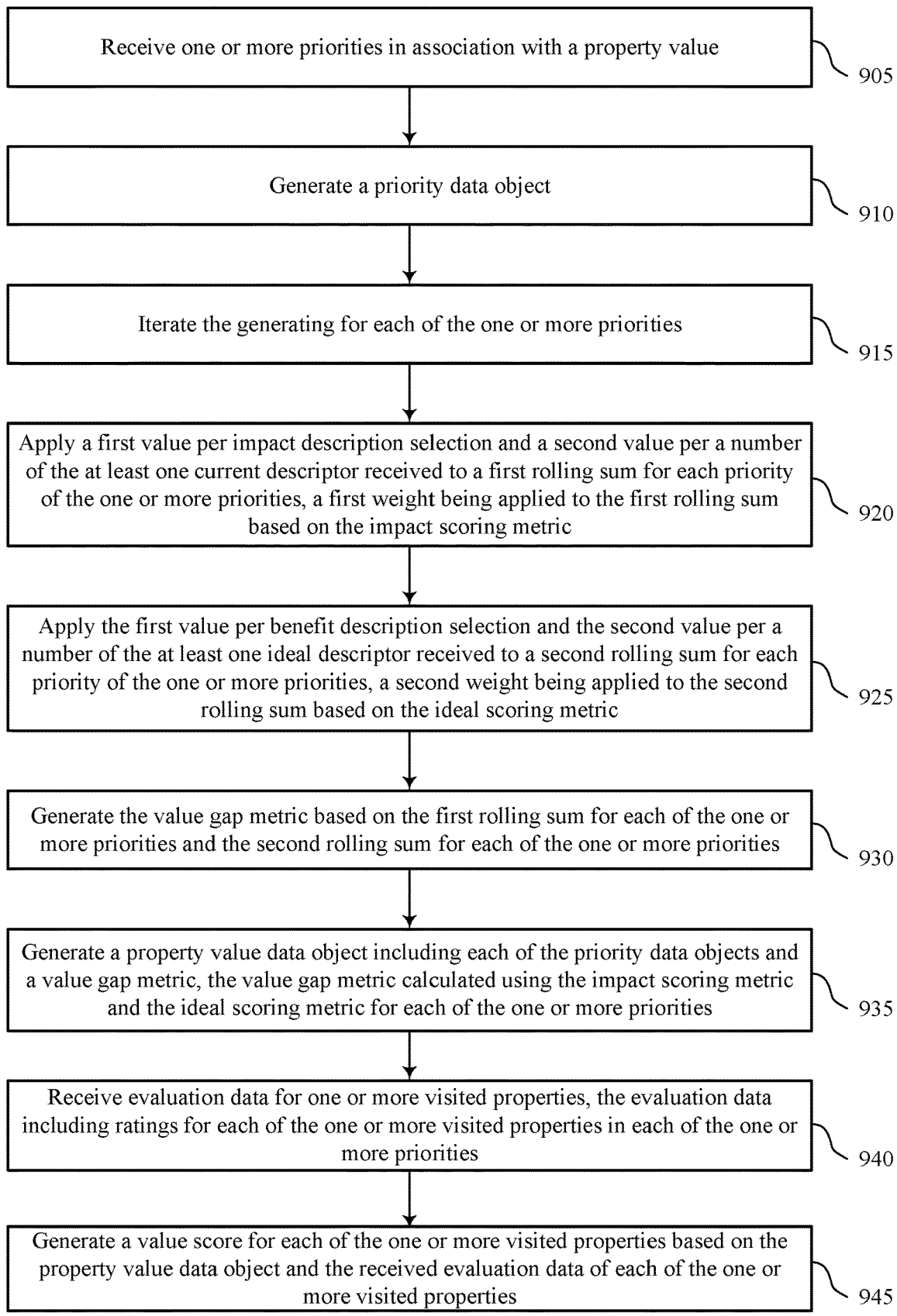

FIG. 9 shows a flowchart illustrating a method 900 that supports property value map generation and processing in accordance with aspects of the present disclosure. The operations of method 900 may be implemented by a server or user device or their components as described herein. In some examples, a server or user device may execute a set of instructions to control the functional elements of the server or user device to perform the functions described herein. Additionally or alternatively, a server or user device may perform aspects of the functions described herein using special-purpose hardware.

At 905, the server or user device may receive one or more priorities in association with a property value. The operations of 905 may be performed according to the methods described herein. In some examples, aspects of the operations of 905 may be performed by a value map generation engine as described with reference to FIGS. 2 through 5.

At 910, the server or user device may generate a priority data object. Generation of the priority data object may include the operation 610 of FIG. 6. The operations of 910 may be performed according to the methods described herein. In some examples, aspects of the operations of 910 may be performed by a value map generation engine as described with reference to FIGS. 2 through 5.

At 915, the server or user device may iterate the generating for each of the one or more priorities. The operations of 915 may be performed according to the methods described herein. In some examples, aspects of the operations of 915 may be performed by a value map generation engine as described with reference to FIGS. 2 through 5.

At 920, the server or user device may apply a first value per impact description selection and a second value per a number of the at least one current descriptor received to a first rolling sum for each priority of the one or more priorities, a first weight being applied to the first rolling sum based on the impact scoring metric. The operations of 920 may be performed according to the methods described herein. In some examples, aspects of the operations of 920 may be performed by a property scoring engine as described with reference to FIGS. 2 through 5.

At 925, the server or user device may apply the first value per benefit description selection and the second value per a number of the at least one ideal descriptor received to a second rolling sum for each priority of the one or more priorities, a second weight being applied to the second rolling sum based on the ideal scoring metric. The operations of 925 may be performed according to the methods described herein. In some examples, aspects of the operations of 925 may be performed by a property scoring engine as described with reference to FIGS. 2 through 5.

At 930, the server or user device may generate the value gap metric based on the first rolling sum for each of the one or more priorities and the second rolling sum for each of the one or more priorities. The operations of 930 may be performed according to the methods described herein. In some examples, aspects of the operations of 930 may be performed by a property scoring engine as described with reference to FIGS. 2 through 5.

At 935, the server or user device may generate a property value data object including each of the priority data objects and a value gap metric, the value gap metric calculated using the impact scoring metric and the ideal scoring metric for each of the one or more priorities. The operations of 935 may be performed according to the methods described herein. In some examples, aspects of the operations of 935 may be performed by a value map generation engine as described with reference to FIGS. 2 through 5.

At 940, the server or user device may receive evaluation data for one or more visited properties, the evaluation data including ratings for each of the one or more visited properties in each of the one or more priorities. The operations of 940 may be performed according to the methods described herein. In some examples, aspects of the operations of 940 may be performed by a feedback engine as described with reference to FIGS. 4 through 5.

At 945, the server or user device may generate a value score for each of the one or more visited properties based on the property value data object and the received evaluation data of each of the one or more visited properties. The operations of 945 may be performed according to the methods described herein. In some examples, aspects of the operations of 920 may be performed by a property scoring engine as described with reference to FIGS. 4 through 5.

Figure 10:
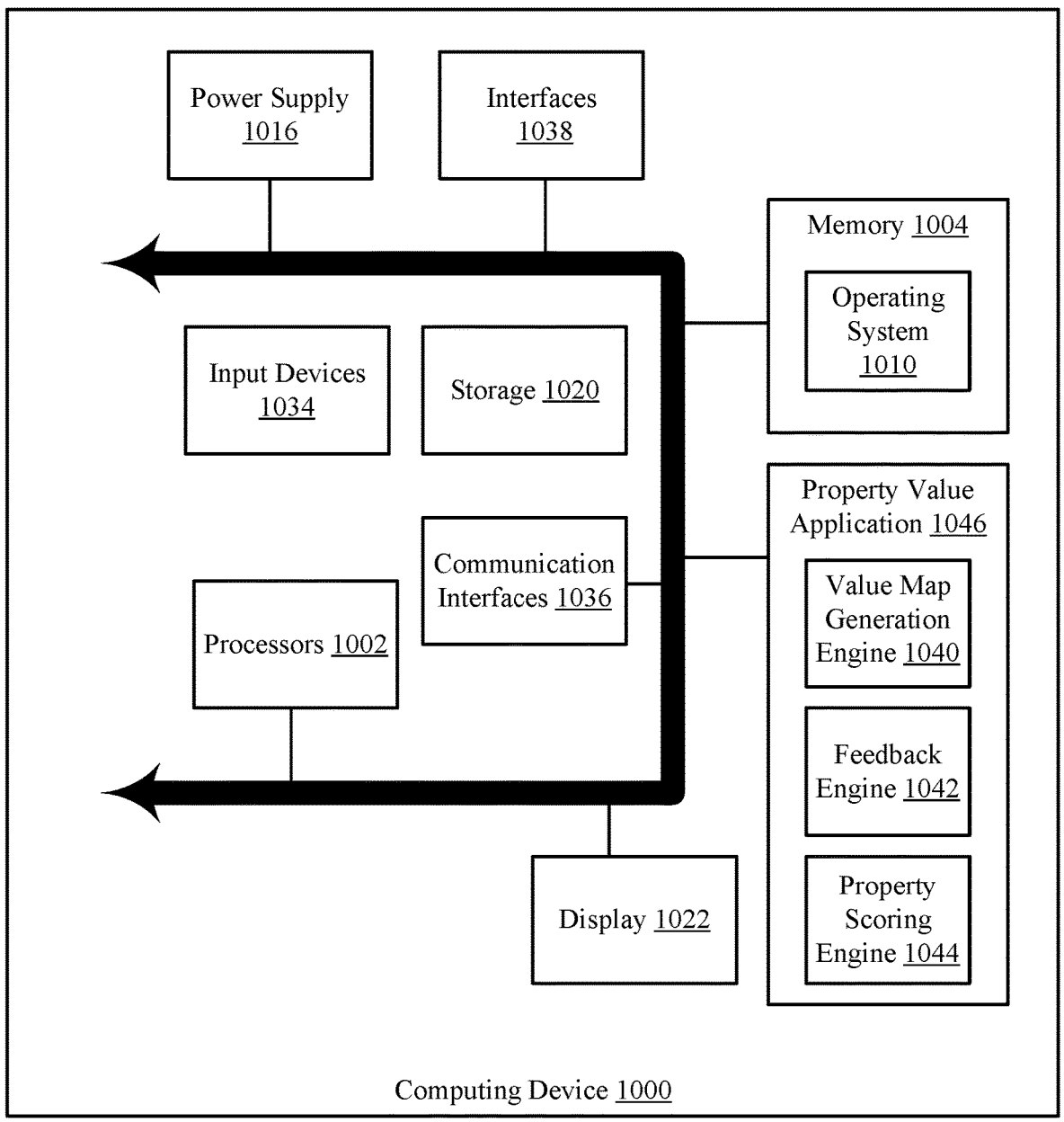
FIG. 10 illustrates an example computing device suitable for implementing one or more disclosed methods in the disclosed technology.

FIG. 10 illustrates an example computing device 1000 suitable for implementing one or more disclosed methods in the disclosed technology. The computing device 1000 may be a client device, such as a laptop, mobile device, desktop, tablet, or a server/cloud device. The computing device 1000 includes one or more processor(s) 1002, and a memory 1004. The memory 1004 generally includes both volatile memory (e.g., RAM) and non-volatile memory (e.g., flash memory). An operating system 1010 resides in the memory 1004 and is executed by the processor(s) 1002.

One or more modules or segments, such as a real estate planning application 1046 are loaded into the operating system 1010 on the memory 1004 and/or storage 1020 and executed by the processor(s) 1002. The modules may include the real estate planning application 1046 implemented by a value map generation engine 1040, a customer feedback engine 1042, and a property ranking engine 1044. Data such as user preferences, hardware configurations, and hardware responses may be stored in the memory 1004 or storage 1020 and may be retrievable by the processor(s) 1002 for use by the value map generation engine 1040, the customer feedback engine 1042, and the property ranking engine 1044. The storage 1020 may be local to the computing device 1000 or may be remote and communicatively connected to the computing device 1000 and may include another server. The storage 1020 may store resources that are requestable by client devices (not shown).

The computing device 1000 includes a power supply 1016, which is powered by one or more batteries or other power sources and which provides power to other components of the computing device 1000. The power supply 1016 may also be connected to an external power source that overrides or recharges the built-in batteries or other power sources.

The computing device 1000 may include one or more communication transceivers which may be connected to one or more antenna(s) to provide network connectivity (e.g., mobile phone network, Wi-Fi®, Bluetooth®) to one or more other servers and/or client devices (e.g., mobile devices, desktop computers, or laptop computers) through a communications interface 1036. The computing device 1000 may further include a network adapter, which is a type of communication device. The computing device 1000 may use the adapter and any other types of communication devices for establishing connections over a wide-area network (WAN) or local-area network (LAN). It should be appreciated that the network connections shown are exemplary and that other communications devices and means for establishing a communications link between the computing device 1000 and other devices may be used.

The computing device 1000 may include one or more input devices 1034 such that a user may enter commands and information (e.g., a keyboard or mouse). These and other input devices may be coupled to the server by one or more interfaces 1038 such as a serial port interface, parallel port, or universal serial bus (USB). The computing device 1000 may further include a display 1022 such as a touch screen display.

The computing device 1000 may include a variety of tangible processor-readable storage media and intangible processor-readable communication signals. Tangible processor-readable storage can be embodied by any available media that can be accessed by the computing device 1000 and includes both volatile and nonvolatile storage media, removable and non-removable storage media. Tangible processor-readable storage media excludes intangible communications signals and includes volatile and nonvolatile, removable and non-removable storage media implemented in any method or technology for storage of information such as processor-readable instructions, data structures, program modules or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information, and which can be accessed by the computing device 1000. In contrast to tangible processor-readable storage media, intangible processor-readable communication signals may embody processor-readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

The implementations of the invention described herein are implemented as logical steps in one or more computer systems. The logical operations of the present invention are implemented (1) as a sequence of processor-implemented steps executed in one or more computer systems and (2) as interconnected machine or circuit modules within one or more computer systems. The implementation is a matter of choice, dependent on the performance requirements of the computer system implementing the invention. Accordingly, the logical operations making up the implementations of the invention described herein are referred to variously as operations, steps, objects, or modules. Furthermore, it should be understood that logical operations may be performed in any order, adding and omitting as desired, unless explicitly claimed otherwise or a specific order is inherently necessitated by the claim language.

Data storage and/or memory may be embodied by various types of storage, such as hard disk media, a storage array containing multiple storage devices, optical media, solid-state drive technology, ROM, RAM, and other technology. The operations may be implemented in firmware, software, hard-wired circuitry, gate array technology and other technologies, whether executed or assisted by a microprocessor, a microprocessor core, a microcontroller, special purpose circuitry, or other processing technologies. It should be understood that a write controller, a storage controller, data write circuitry, data read and recovery circuitry, a sorting module, and other functional modules of a data storage system may include or work in concert with a processor for processing processor-readable instructions for performing a system-implemented process.

For purposes of this description and meaning of the claims, the term "memory" (e.g., memory 1004) means a tangible data storage device, including non-volatile memories (such as flash memory and the like) and volatile memories (such as dynamic random-access memory and the like). The computer instructions either permanently or temporarily reside in the memory, along with other information such as data, virtual mappings, operating systems, applications, and the like that are accessed by a computer processor to perform the desired functionality. The term "memory" or "storage medium" expressly does not include a transitory medium such as a carrier signal, but the computer instructions can be transferred to the memory wirelessly.

The above specification, examples, and data provide a complete description of the structure and use of exemplary implementations of the invention. Since many implementations of the invention can be made without departing from the spirit and scope of the invention, the invention resides in the claims hereinafter appended. Furthermore, structural features of the different implementations may be combined in yet another implementation without departing from the recited claims. While embodiments and applications of this invention have been shown, and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method of data processing, comprising:
  receiving, from a user interface of a user device, an indication of one or more priorities in association with a property value;
  generating a priority data object, wherein generating the priority data object comprises:
    causing to display at the user interface of the user device, based at least in part on the one or more priorities, a listing of descriptors corresponding to the one or more priorities, wherein the listing of descriptors includes a sub-listing a known property, the sub-listing including a listing of positive descriptors and a listing of negative descriptors,
    receiving, from the user interface of the user device and for the priority data object, an indication of selection of at least one current descriptor and at least one ideal descriptor corresponding to one of the one or more priorities and from the displayed listing of descriptors, the at least one current descriptor corresponding to the known property and the at least one ideal descriptor corresponding to an unknown property,
    generating a prompt based on whether the at least one current descriptor corresponding to the known property is selected from the listing of positive descriptors or the listing of negative descriptors,
    receiving, from the user interface of the user device in response to generating the prompt and for the at least one current descriptor corresponding to the known property, at least one impact description selection from a listing of impact descriptions,
    receiving, from the user interface and for the at least one ideal descriptor corresponding to the unknown property, at least one benefit description selection from a listing of benefit descriptions, and
    receiving, from the user interface, a selection of an impact scoring metric for the selection from the listing of impact descriptions and a selection of an ideal scoring metric for the selection from the listing of benefit descriptions;
  iterating the generating for each of the one or more priorities;
  generating a property value data object including each of the priority data objects and a value gap metric, the value gap metric calculated using the impact scoring metric and the ideal scoring metric for each of the one or more priorities;
  receiving evaluation data for one or more visited properties, the evaluation data including ratings for each of the one or more visited properties in each of the one or more priorities; and
  generating a value score for each of the one or more visited properties based on the property value data object and the received evaluation data of each of the one or more visited properties.

2. The method of claim 1, further comprising:
  displaying the listing of impact descriptions associated with the at least one current descriptor based on whether the at least one current descriptor corresponding to the known property is selected from the listing of positive descriptors or the listing of negative descriptors.

3. The method of claim 1, wherein generating the value score further comprises:
  adding, for a first property, the ratings in each of the one or more priorities for the first property;
  weighting the added ratings based on the value gap metric; and
  generating the value score for the first property based on the weighted added ratings.

4. The method of claim 1, further comprising:
  applying a first value per impact description selection and a second value per a number of the at least one current descriptor received to a first rolling sum for each priority of the one or more priorities, a first weight being applied to the first rolling sum based on the impact scoring metric;
  applying the first value per benefit description selection and the second value per a number of the at least one ideal descriptor received to a second rolling sum for each priority of the one or more priorities, a second weight being applied to the second rolling sum based on the ideal scoring metric; and generating the value gap metric based on the first rolling sum for each of the one or more priorities and the second rolling sum for each of the one or more priorities.

5. An apparatus for data processing, comprising:
a processor,
memory in electronic communication with the processor; and
instructions stored in the memory and executable by the processor to cause the apparatus to:
receive, from a user interface of a user device, an indication of one or more priorities in association with a property value;
generate a priority data object, wherein generating the priority data object comprises:
causing to display at the user interface of the user device, based at least in part on the one or more priorities, a listing of descriptors corresponding to the one or more priorities, wherein the listing of descriptors includes a sub-listing for a known property, the sub-listing including a listing of positive descriptors and a listing of negative descriptors,
receiving, from the user interface of the user device and for the priority data object, an indication of selection of at least one current descriptor and at least one ideal descriptor corresponding to one of the one or more priorities and from the displayed listing of descriptors, the at least one current descriptor corresponding to the known property and the at least one ideal descriptor corresponding to an unknown property,
generating a prompt based on whether the at least one current descriptor corresponding to the known property is selected from the listing of positive descriptors or the listing of negative descriptors,
receiving, from the user interface of the user device in response to generating the prompt and for the at least one current descriptor corresponding to the known property, at least one impact description selection from a listing of impact descriptions,
receiving, from the user interface and for the at least one ideal descriptor corresponding to the unknown property, at least one benefit description selection from a listing of benefit descriptions, and
receiving, from the user interface, a selection of an impact scoring metric for the selection from the listing of impact descriptions and a selection of an ideal scoring metric for the selection from the listing of benefit descriptions;
iterate the generating for each of the one or more priorities,
generate a property value data object including each of the priority data objects and a value gap metric, the value gap metric calculated using the impact scoring metric and the ideal scoring metric for each of the one or more priorities,
receive evaluation data for one or more visited properties, the evaluation data including ratings for each of the one or more visited properties in each of the one or more priorities, and
generate a value score for each of the one or more visited properties based on the property value data object and the received evaluation data of each of the one or more visited properties.

6. The apparatus of claim 5, wherein the instructions are further executable by the processor to cause the apparatus to:
display the listing of impact descriptions associated with the at least one current descriptor based on whether the at least one current descriptor corresponding to the known property is selected from the listing of positive descriptors or the listing of negative descriptors.

7. The apparatus of claim 5, wherein the instructions to generate the value score further are executable by the processor to cause the apparatus to:
add, for a first property, the ratings in each of the one or more priorities for the first property;
weight the added ratings based on the value gap metric; and
generate the value score for the first property based on the weighted added ratings.

8. The apparatus of claim 5, wherein the instructions are further executable by the processor to cause the apparatus to:
apply a first value per impact description selection and a second value per a number of the at least one current descriptor received to a first rolling sum for each priority of the one or more priorities, a first weight being applied to the first rolling sum based on the impact scoring metric;
apply the first value per benefit description selection and the second value per a number of the at least one ideal descriptor received to a second rolling sum for each priority of the one or more priorities, a second weight being applied to the second rolling sum based on the ideal scoring metric; and
generate the value gap metric based on the first rolling sum for each of the one or more priorities and the second rolling sum for each of the one or more priorities.

9. A non-transitory computer-readable medium storing code for data processing, the code comprising instructions executable by a processor to:
receive, from a user interface of a user device, an indication of one or more priorities in association with a property value;
generate a priority data object, wherein generating the priority data object comprises:
causing to display at the user interface of the user device, based at least in part on the one or more priorities, a listing of descriptors corresponding to the one or more priorities, wherein the listing of descriptors includes a sub-listing for a known property, the sub-listing including a listing of positive descriptors and a listing of negative descriptors,
receiving, from the user interface of the user device and for the priority data object, an indication of selection of at least one current descriptor and at least one ideal descriptor corresponding to one of the one or more priorities and from the displayed listing of descriptors, the at least one current descriptor corresponding to the known property and the at least one ideal descriptor corresponding to an unknown property,
generating a prompt based on whether the at least one current descriptor corresponding to the known property is selected from the listing of positive descriptors or the listing of negative descriptors,
receiving, from the user interface of the user device in response to generating the prompt and for the at least one current descriptor corresponding to the known property, at least one impact description selection from a listing of impact descriptions, receiving, from the user interface and for the at least one ideal descriptor corresponding to the unknown property, at least one benefit description selection from a listing of benefit descriptions, and receiving, from the user interface, a selection of an impact scoring metric for the selection from the listing of impact descriptions and a selection of an ideal scoring metric for the selection from the listing of benefit descriptions;

iterate the generating for each of the one or more priorities;

generate a property value data object including each of the priority data objects and a value gap metric, the value gap metric calculated using the impact scoring metric and the ideal scoring metric for each of the one or more priorities;

receive evaluation data for one or more visited properties, the evaluation data including ratings for each of the one or more visited properties in each of the one or more priorities; and generate a value score for each of the one or more visited properties based on the property value data object and the received evaluation data of each of the one or more visited properties.

10. The non-transitory computer-readable medium of claim 9, wherein the instructions are further executable to:
display the listing of impact descriptions associated with the at least one current descriptor based on whether the at least one current descriptor corresponding to the known property is selected from the listing of positive descriptors or the listing of negative descriptors.

11. The non-transitory computer-readable medium of claim 9, wherein the instructions to generate the value score further are executable to:
add, for a first property, the ratings in each of the one or more priorities for the first property;
weight the added ratings based on the value gap metric; and
generate the value score for the first property based on the weighted added ratings.

12. The non-transitory computer-readable medium of claim 9, wherein the instructions are further executable to:
apply a first value per impact description selection and a second value per a number of the at least one current descriptor received to a first rolling sum for each priority of the one or more priorities, a first weight being applied to the first rolling sum based on the impact scoring metric;
apply the first value per benefit description selection and the second value per a number of the at least one ideal descriptor received to a second rolling sum for each priority of the one or more priorities, a second weight being applied to the second rolling sum based on the ideal scoring metric; and
generate the value gap metric based on the first rolling sum for each of the one or more priorities and the second rolling sum for each of the one or more priorities.

* * * * *